United States Patent [19]

Rork

[11] 4,128,447

[45] Dec. 5, 1978

[54] METHOD AND ARTICLE TREATING PICTURES

[76] Inventor: Marjorie A. Rork, 2033 Sherman Ave., Evanston, Ill. 60201

[21] Appl. No.: 809,867

[22] Filed: Jun. 24, 1977

Related U.S. Application Data

[63] Continuation-in-part of Ser. No. 632,466, Nov. 17, 1975, abandoned.

[51] Int. Cl.[2] ........................ B32B 31/12; B32B 31/22

[52] U.S. Cl. .................................... 156/155; 156/344; 427/258; 427/260; 428/196

[58] Field of Search ................. 156/76, 155, 344, 234, 156/237, 240; 428/196, 195; 427/282, 258, 259, 260

[56] References Cited

U.S. PATENT DOCUMENTS

| | | | |
|---|---|---|---|
| 189,117 | 4/1877 | Luther | 156/76 |
| 1,797,998 | 3/1931 | Sadtler | 427/258 X |
| 2,037,008 | 4/1936 | Corbin | 156/76 |
| 2,273,894 | 2/1942 | Riedel | 428/196 X |
| 2,489,987 | 11/1949 | Barnola | 428/914 |
| 2,840,487 | 6/1958 | Messina | 427/260 |
| 3,130,113 | 4/1964 | Silman | 428/196 |

*Primary Examiner*—Thomas J. Herbert, Jr.
*Attorney, Agent, or Firm*—Watson D. Harbaugh

[57] ABSTRACT

The method and product comprising protecting picture portraying elements upon paper with one or more coats of a permanent non-water soluble sizing which dries transparent; then covering the face with a cloth bonded thereto by a clear liquid which dries transparent and renders the cloth transparent, resulting in an oil-painting-like effect and providing to the paper and to the picture-portraying elements thereon, the capability of being washed, sewn, treated like fabric as well as being rendered waterproof; then, optionally, the paper backing can be removed by soaking with water to: (1) provide greater flexibility and washability, and a measure of transparency which can be enhanced further by the application to the reverse side of one or more coats of a clear liquid such as sizing or varnish resulting in a stained glass window effect viewable from either side with a direct or reflected illumination or (2) after the paper backing has been removed the opacity originally provided by the paper backing can be restored by the application of acrylic or oil paint, paper, or fabric in white or color to the reverse side to provide a particular texture or color background either present in the original paper backing or differing from it.

6 Claims, 5 Drawing Figures

METHOD AND ARTICLE TREATING PICTURES

Figure 1:
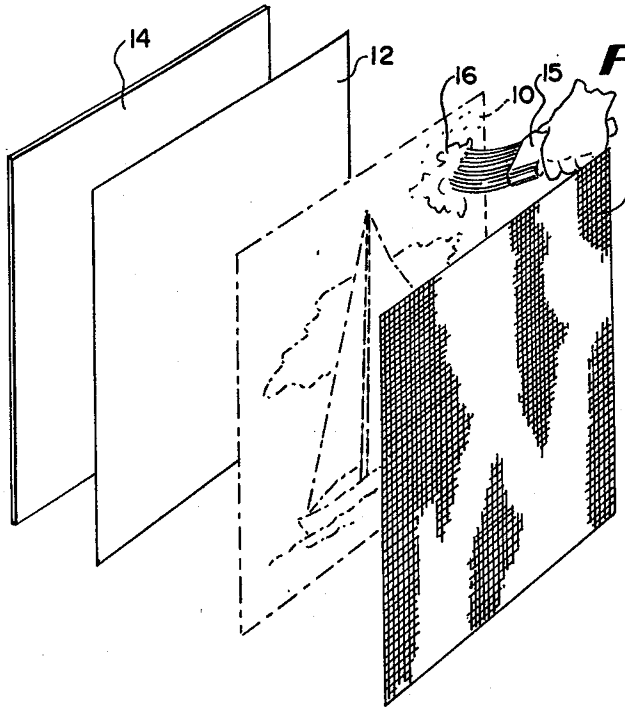

This application is a continuation-in-part of my application Ser. No. 632,466 filed Nov. 17, 1975, now abandoned.

BACKGROUND OF THE INVENTION

An early endeavor to cover pictures with a textile fabric is shown in Luther U.S. Pat. No. 189,117 in which a picture is covered with a textile fabric adhered thereto and rendered transparent by a varnish or glue to render the picture waterproof and obviate scaling and cracking.

In Corbin U.S. Pat. No. 2,037,008 a sheet is coated on the underside with a penetrating varnish which renders it transparent with a printed ornament still visible. The ornamented sheet is imposed on foil and the upper surface coated with varnish to complete the transparency with ornament visible and the luster of the sheet visible to form a background while also waterproofing the sheet and securing it to a base such as a cardboard or paper.

However, in both of these instances, with any picture having a paper backing present, the varnish or shellac saturates into the paper to a degree causing overall spotting, discoloration or a disagreeable appearance of the picture either in whole or in part rendering the picture substantially useless. Generally the oil soaked paper would lose its original color and obliterate all or part of the picture making the picture worthless. Furthermore, if there were any printing on the other side of the paper, it would objectionably show through.

SUMMARY OF THE INVENTION

I have found that applying a sizing coat on the face of a picture, whether it be a photograph, print or painting, not only seals the surface against varnish penetration and discoloration that would cause damage occurring with earlier uses of varnishes, but also the sizing bonds with the picture-portraying elements, and with a cloth covering the sizing and picture, the varnish permanently bonds the cloth to the sized picture and also renders the cloth transparent. Furthermore, the elimination of varnish penetration and the reliance on the cloth to provide strength for handling, provide capability of soaking away the paper base leaving the sized picture portraying elements supports by the cloth covering the face of the picture. If greater transparency is desired, one or more coats of the sizing of varnish may be applied to the reverse side creating a stained glass window effect, viewable from either side with any effective illumination thereof from either or both sides thereof.

Removal of the paper backing renders the picture completely washable, more flexible, and waterproof as well as permitting application of other fabric, paint, or paper replacing the paper backing which has been soaked away.

IN THE DRAWINGS

Figure 3:
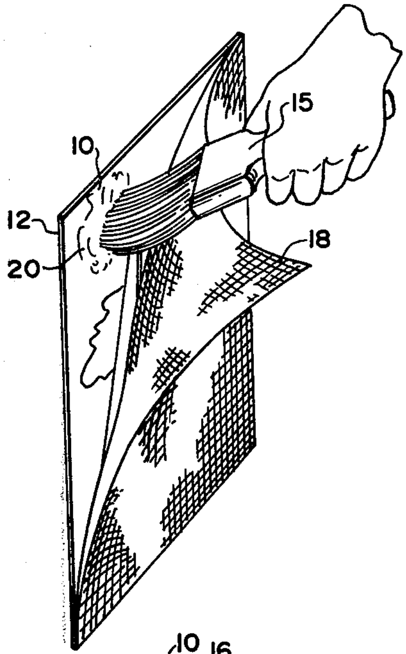
Figure 2:
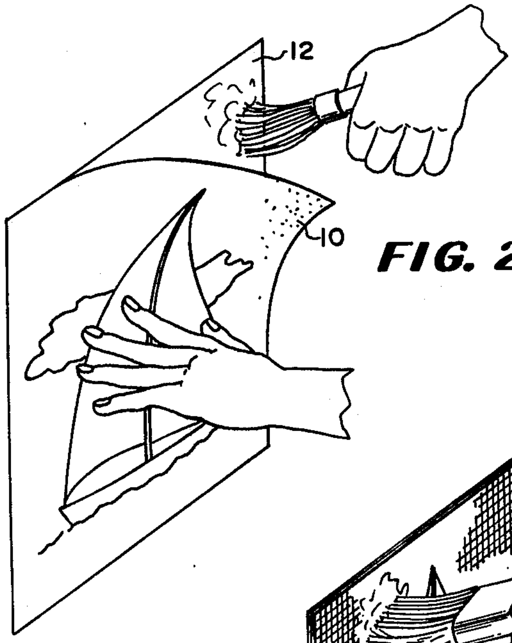
Figure 4:
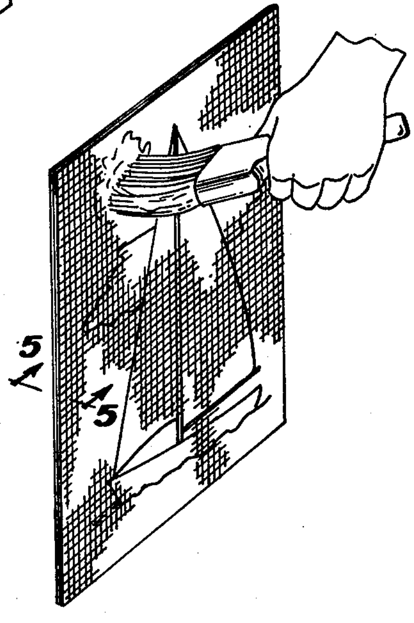
Figure 5:
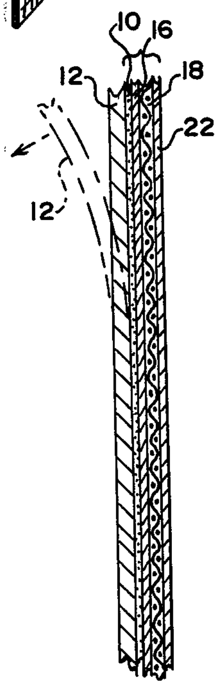

FIG. 1 is an exploded perspective view of four elements that can be employed in the invention which when assembled provide backed picture-portraying elements and a fabric for covering the face of the picture;

FIG. 2 portrays the existence of picture portraying elements that are adhered to a water softenable picture-backing either by printing thereon or by adding it as held by a water soluble interface coating;

FIG. 3 indicates the application of the fabric to the face of the picture after it has been sized;

FIG. 4 indicates the finish coating of the viewing side of the picture;

FIG. 5 is an enlarged cross-sectional view taken upon line 5—5 in FIG. 4 indicating the optional ability of removing the paper base.

DESCRIPTION OF THE INVENTION

In the present invention a picture is shown in the drawing, as illustrated, indicating picture-portraying elements in a phantom plane at 10. This picture may be produced photographically or graphically in black and white or colors by a camera, pens, brushes or painting in oils or water color, and its backing 12 which conventionally supports the picture-portraying elements 10 is shown as capable of separation therefrom as by soaking with water for loosening and removal from the elements 10 that provide the picture effect and optionally may be replaced by some alternate backing substance. The removed backing 12 generally is an integral part of a photographic print but it could be a transparency or a transparent positive upon which the picture elements are already supported.

A cloth covering is provided for the front of the picture which can be generally referred to as a fabric 18 made of a material which becomes transparent when its thread surfaces become wetted with a clear liquid.

The ability inherent in the process, which permits the removal of the paper backing also permits the use of any picture which has designs, drawing, painting, etc., on the reverse side which otherwise would objectionably show through if not capable of removal.

The picture may be retouched, repainted, highlighted, or color corrected before a fabric 18 is applied. Other visual elements not in the original picture can be cut and added if desired since a canvas-like fabric covering 18 obfuscates the original surface texture and boundaries would be indistinguishable.

A brush 15 is shown applying a transparent sizing 16 to the front face of the picture 10. The sizing to be used may be an acrylic or water based solution or an all-purpose glue or mixture thereof or any such non-water soluble substance which is transparent or becomes transparent when dry. The adherence of the sizing to the picture elements and to the further application of the fabric and varnish must be permanent.

Preferably, in most instances the covering 18 will be a woven cloth of light thread generally referred to as a "scrim," although it could be matted, spun, or manufactured by some method other than woven. Either the covering 18 can be laid first over the picture or a varnish 20 can be applied first, as indicated in FIG. 3 provided that the scrim in either method becomes saturated completely with the varnish for adherence to the sizing that is adhered to the picture portraying elements.

Thereupon, one or more costs 22 of varnish 20 are applied to the fabric 18 and they render the fabric transparent by providing a minimal light-absorbing and non-reflective surface of incidence for these elements, they being of essentially clear transparent material when dried. Further coats can be applied to provide depth and the nature of the final finish desired.

The improved and novel products may be considered at this stage to be finished, if desired, since the sizing has prevented any varnish penetration that would discolor or mar the picture. However, since there has been no soaking of varnish into the paper backing the paper base which may include elements 12 and 14 can be soaked free thereupon leaving a transparent picture akin to strained glass in appearance which may preferably be protected by a back coating of varnish or sizing to protect the picture-portraying elements from damage in handling. Then the picture can be located in front of a source light or have a paper or material of any tint or shade disposed in the back side for reflective background color harmony or decorativeness. The prints, photographs, pigments or paints so covered by fabric and protectively coated are now waterproof and protected from dirt and can be kept clean with soap and water.

An important reason for removing the paper backing is to permit permanent bonding when the picture, drawing, or design is to be attached to a fabric or garment that will be washed. Unless the paper backing has been removed before the design is adhered by an adhesive, the adhesive will have bonded paper backing to the surface but in washing or in rough usage the design will pull loose. For permanent bondage, the adhesive of a permanent non-water soluble type must be applied directly to the picture bearing layer and this can only be done if the intervening paper backing is removed by soaking it free.

Thus, oil or solvent penetration of the base, damaging the appearance of the picture is eliminated; the transfer of adherence of the picture elements from the backing to a sizing which will be of a non-water soluble substance which becomes transparent when dry and the permanent adherence of a cloth bonded to the sized picture elements provide versatility of product results; permitting the fabric covered picture portraying elements to be treated and handled as fabric, i.e., to be washed, stitched, and treated as a fabric might as well as being rendered waterproof. Also removal of the paper backing by water soaking provides transparency of the picture like a stained glass window or the opacity of the backing may be restored by the application of paint, fabric, or paper to the reverse side. Alteration in the original picture may be achieved in this way also by applying a color differing from the original backing which will alter the overall appearance and impression of the picture. These constitute a novel treatment of a picture and provide a novel product.

By way of example, the materials employed in performing the process and providing the product may be as follows:

Sizing or base coat for quick drying:

- Sizing or base coat consists of a water-based but non-water soluble solution when dry.
- Sizing or base coat must be transparent either in its original state or when dry and of permanent adherence such as acrylics or all purpose white glue.
- Sizing or base coat may also be used for back coating if desired.
- Acrylic polymers, either gloss or matte with some white glue.

Fabric or cloth:

- A natural or synthetic fabric such as silk, satin, rayon-acetate with or without some mixture of polyester.

Face coating and back coating referred to as varnish one or more coatings of:

- Varnish, shellac, polyurethane, lacquer, vinyl or mixtures thereof.

Soaking off of the backing, soaking with water and peeling off backing as it softens. (The picture-portraying elements are adhered to the sizing.)

After paper backing is removed in whole or part, picture, if desired, may be mounted on any material suitable for handling or use to which the picture is to be used.

What is claimed is:

1. The method of making a picture viewable in reverse from opposite sides and having picture-portraying elements directly contacting and carried on an opaque water absorbent paper base for direct viewing comprising;
   (A) applying to the exposed face of the picture elements a layer of liquid sizing material that is transparent and non-water soluble when dry, drying said sizing material and adhering the picture portraying elements permanently thereto,
   (B) reinforcing the sized face with a flexible fabric reinforcing material covering including applying a varnish adhesive finishing fluid coating that is non-soluble in water for adhering said fabric to said sized face and rendering the reinforcing material transparent,
   (C) saturating the flexible fabric material with a permanent protective coating of varnish to provide maximum reflective transparency,
   (D) soaking with water and peeling away the paper base after performing steps (A), (B) and (C) to render the picture elements transparently viewable from the other side in reverse relation, and
   (E) directly coating the back of the viewable picture elements with a permanent non-water soluble transparent adhesive.
2. The method defined in claim 1 including tinting the picture elements before said coating of the back of the viewable picture elements.
3. The method defined in claim 1 including applying a background color to the picture portraying elements differing from the color of the original background color.
4. The method in claim 1 including retouching the viewable picture elements before the last step, and coating the back of the viewable picture.
5. The method in claim 1 including securing the picture to a fabric backing.
6. The method as defined in claim 1, wherein picture portraying elements directly contact and are carried on both sides of the opaque water absorbent paper base, further comprising the steps of performing steps (A), (B), and (C) on both sides of the paper base and soaking with water and peeling away the paper base from the sized picture portraying elements on both sides of the paper base, after performing steps (A), (B) and (C).

* * * * *